United States Patent [19]
Post

[11] Patent Number: 5,787,697
[45] Date of Patent: Aug. 4, 1998

[54] COMBINE CROP DIVIDER ASSEMBLY

[75] Inventor: Warren L. Post, Sioux Center, Iowa

[73] Assignee: Vande Weerd Combine, Inc., Rock Valley, Iowa

[21] Appl. No.: 676,424

[22] Filed: Jul. 8, 1996

[51] Int. Cl.$^6$ .................................................. A01D 45/02
[52] U.S. Cl. ................................... 56/119; 56/314
[58] Field of Search ................... 56/14.6, 98, 119, 56/314, 364, DIG. 1; 460/16, 73

[56] References Cited

U.S. PATENT DOCUMENTS

| | | | |
|---|---|---|---|
| 1,852,702 | 4/1932 | Coultas et al. | 56/119 |
| 2,349,905 | 5/1944 | Hyman . | |
| 2,862,345 | 12/1958 | Wigham . | |
| 3,271,940 | 9/1966 | Ashton et al. . | |
| 4,219,992 | 9/1980 | Henry, Sr. | 56/119 |
| 4,330,983 | 5/1982 | Moore | 56/314 |
| 4,493,181 | 1/1985 | Glendenning et al. | 56/119 X |
| 4,502,270 | 3/1985 | Shuperf | 56/119 X |
| 4,538,404 | 9/1985 | Heimark, Jr. et al. . | |
| 4,700,537 | 10/1987 | Emmert . | |
| 5,161,355 | 11/1992 | Diederich, Jr, . | |
| 5,195,309 | 3/1993 | Mossman . | |
| 5,444,968 | 8/1995 | Barton | 56/119 |

FOREIGN PATENT DOCUMENTS

| | | | |
|---|---|---|---|
| 3611615 | 10/1987 | Germany | 56/119 |

*Primary Examiner*—Michael J. Carone
*Assistant Examiner*—Robert Pezzuto
*Attorney, Agent, or Firm*—Hovey, Williams, Timmons & Collins

[57] ABSTRACT

A crop divider assembly is provided for use on the row crop header of a combine or the like, and includes an elongated, hollow, double-walled divider and a similarly constructed snout. The divider includes longitudinally opposed proximal and distal ends, and defines a central groove extending longitudinally from the distal end toward the proximal end. The snout includes an upper proximal end, an opposed lower distal end, a semi-conical top wall, and a bottom wall defining a centrally disposed depending tongue extending longitudinally from the upper proximal end toward the lower distal end. The tongue is sized for receipt in the groove and is supported in the groove for pivotal movement about an axis extending in a direction transverse to the length of the groove so that the groove guides pivotal movement of the snout and prevents relative lateral shifting.

10 Claims, 2 Drawing Sheets

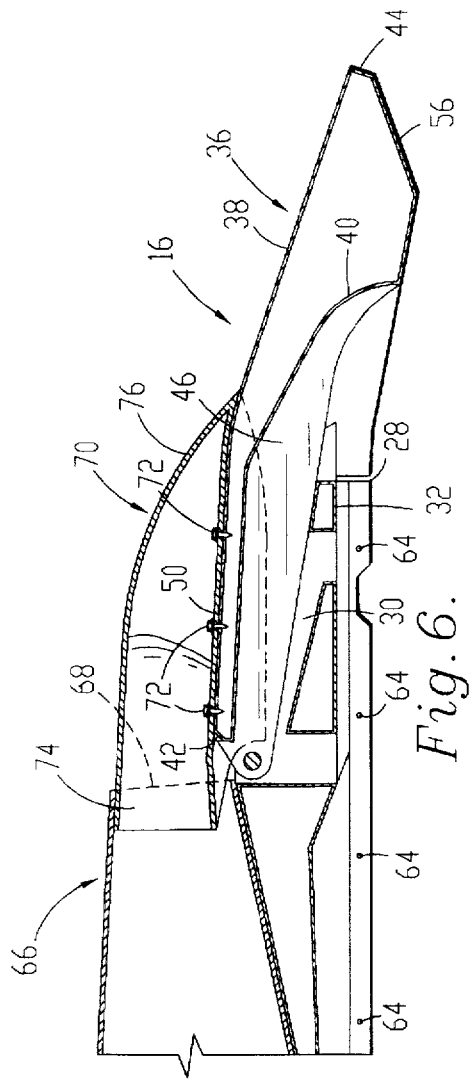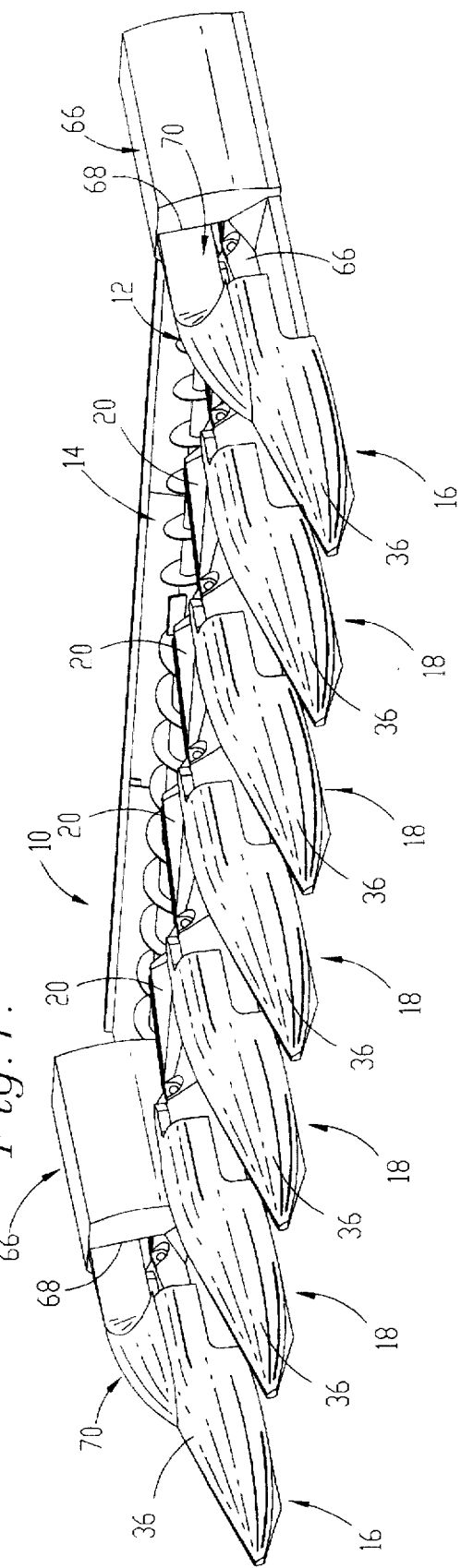

COMBINE CROP DIVIDER ASSEMBLY

BACKGROUND OF THE INVENTION

1. Field of the Invention

The present invention relates generally to the art of crop harvesting, and more particularly to a crop divider assembly for use on the row crop header of a combine or the like.

2. Discussion of the Prior Art

A conventional combine is provided with a row crop header for directing row crops into harvesting assemblies of the combine. A typical row crop header includes a frame extending in a direction transverse to the direction of travel of the combine, and a plurality of row units that define gaps into which the rows of crop are gathered. The harvesting assemblies include cutting mechanisms that cut the crop, and an auger is provided at the proximal ends of the row units adjacent the harvesting assemblies and extends the width of the frame for transporting cut crop to a central feeder house.

The row crop header also includes a plurality of crop divider assemblies secured to the row units for directing crops into the gaps defined by the row units. Each crop divider assembly includes a proximal semi-cylindrical divider and a distal semi-conical snout. The divider is typically secured to one of the row units and supports the snout at the lower proximal corners thereof for pivotal movement about a transverse axis. A cable or chain is connected between the divider and the snout for limiting the extent to which the snout is able to pivot downward relative to the divider toward the ground while permitting the snout to be pivoted upward. Thus, the snout is free to lift off of the ground as the combine travels over uneven terrain.

In order to secure the snout to the divider in the conventional construction, it is necessary to provide pivot connectors at both lower proximal corners of the semi-conical snout, and to provide the cable or chain as noted. Thus, three points of connection exist between the snout and divider.

OBJECTS AND SUMMARY OF THE INVENTION

It is an object of the present invention to provide a crop divider assembly that requires only a single point of attachment between a snout and divider, reducing the number of fasteners required in the assembly, and simplifying manufacture and use thereof.

It is another object of the invention to provide a crop divider including a snout and divider that include a tongue-and-groove construction for guiding pivotal movement of the snout while limiting unwanted side-to-side lateral shifting movement of the snout.

In accordance with these and other objects evident from the following description of a preferred embodiment of the invention, a crop divider assembly is provided for use on the row crop header of a combine or the like. The crop divider assembly includes a divider including a means for permitting the divider to be secured to the row crop header, and a snout presenting an upper proximal end that is supported on the divider for pivotal movement about an axis extending in a direction transverse to the length of the snout between raised and lowered positions, and a distal end that protrudes beyond the divider. A distal end of the divider defines a stop that is engaged by the snout when the snout is pivoted to the lowered position to limit the extent of lowering of the snout relative to the divider.

By providing a crop divider assembly in accordance with the present invention, numerous advantages are realized. For example, by utilizing a construction including a single point of attachment between the snout and divider, it is possible to reduce the number of parts employed in the assembly, simplifying the construction and reducing the manufacturing cost thereof.

Preferably, the divider includes longitudinally spaced proximal and distal ends, and an upper wall defining a centrally disposed groove extending longitudinally from the distal end of the divider toward the proximal end, and the snout includes an upper proximal end, an opposed lower distal end, and a centrally disposed depending tongue extending longitudinally from the upper proximal end of the snout toward the lower distal end. The tongue is sized for receipt in the groove so that the groove guides pivotal movement of the snout and prevents relative lateral shifting. Thus, in addition to reducing the number of parts employed in the assembly, improved operation is also achieved.

BRIEF DESCRIPTION OF THE DRAWING FIGURES

The preferred embodiment of the present invention is described in detail below with reference to the attached drawing figures, wherein:

FIG. 1 is a perspective view of a row crop header of a combine or the like, illustrating a plurality of crop divider assemblies constructed in accordance with the preferred embodiment;

FIG. 6 is a sectional view similar to FIG. 4 of an end row crop divider assembly, illustrating an end cap assembly forming a part thereof.

DETAILED DESCRIPTION OF THE PREFERRED EMBODIMENT

A row crop header of a combine or the like constructed in accordance with the preferred embodiment is illustrated in FIG. 1, and broadly includes a frame 10 extending in a direction transverse to the direction of travel of the combine, and a plurality of row units that define gaps into which the rows of crop are gathered. As is conventional, the row units includes harvesting assemblies provided with cutting mechanisms that cut the crop, and an auger 12 is provided at the proximal ends of the row units adjacent the harvesting assemblies and extends the width of the frame for transporting cut crop to a central feederhouse opening 14 in the frame.

Figure 2:
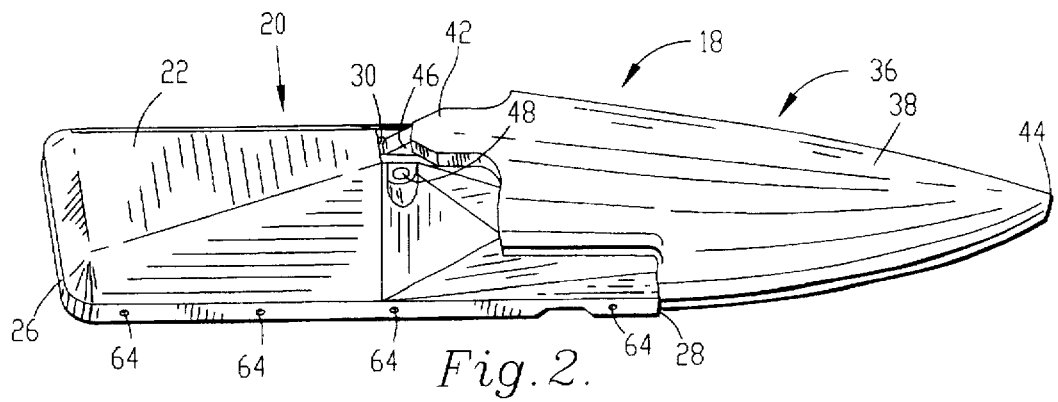
FIG. 2 is a perspective view of a center row crop divider assembly constructed in accordance with the preferred embodiment.

The row crop header also includes a plurality of crop divider assemblies 16, 18 secured to the row units for directing crops into the gaps defined by the row units. The end row assemblies 16 are mounted on the endmost row units of the combine, and the center row assemblies 18 are mounted on the intermediate units. As shown in FIG. 2, each crop divider assembly 18 includes a proximal divider and a distal semi-conical snout, each of which is preferably formed of a hollow, double-walled construction of synthetic resin material such as polyethylene in a rotation molding process. Similarly, with regard to FIG. 1, the assemblies 16 are also provided with a proximal divider and a distal semi-conical snout, each formed of a hollow, double-walled construction of synthetic resin material such as polyethylene in a rotation molding process.

Figure 4:
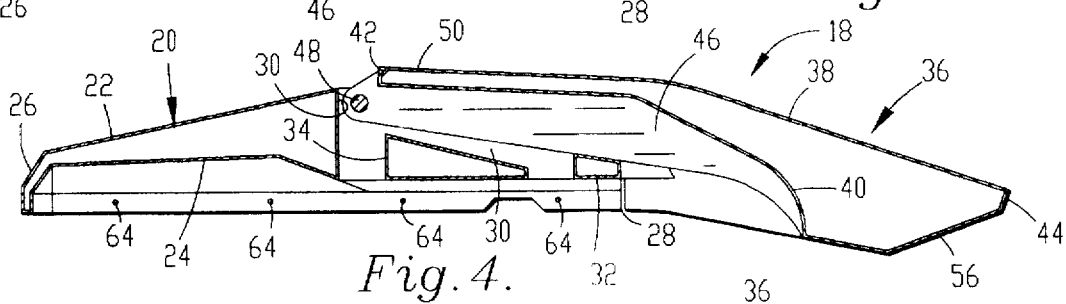
FIG. 4 is a sectional view taken along line 4—4 of FIG. 3.

The divider 20 of each center row assembly 18 includes an upper wall 22 presenting a multifaceted outer surface that is generally semi-cylindrical, as shown in FIG. 2, and a concave lower wall 24, illustrated in FIG. 4, having a shape corresponding generally to the shape of the upper wall to support the divider and add rigidity to the construction. The shaped divider includes longitudinally spaced proximal and distal ends 26, 28, and defines a centrally disposed groove 30 extending longitudinally from the distal end 28 of the divider toward the proximal end 26. The side walls of the groove are parallel to one another, and a pair of spacers 32, 34 connect the side walls together and support the divider in and around the groove. In addition, at least one of the spacers defines a stop for limiting the range of pivotal movement of the snout relative to the divider within the groove, as described below.

The groove 30 extends one half the distance from the distal end of the divider toward the proximal end, and a transverse hole extends through the upper wall and intersects the groove at the upper proximal end of the groove, as shown in FIG. 2.

Returning to FIG. 4, the snout 36 of each center row assembly 18 includes an upper wall 38 of generally semi-conical shape and a lower wall 40 spaced from the upper wall. The snout includes longitudinally spaced proximal and distal ends 42, 44, and a centrally disposed depending tongue 46 extending longitudinally from the upper proximal end of the snout toward the lower distal end 44. The tongue includes a pair of spaced, parallel side walls, and is sized for receipt in the groove 30 so that the groove guides pivotal movement of the snout and prevents relative lateral shifting thereof throughout the entire range of relative movement of the snout.

The proximal end of the tongue 46 protrudes axially beyond the proximal end of the upper wall 38, and a transverse hole is formed in the tongue within this protrusion. The transverse hole is aligned with the holes in the divider during manufacture of the crop divider assembly, and a pin 48 is provided which extends through the holes to secure the snout to the divider for relative pivotal movement.

Figure 3:
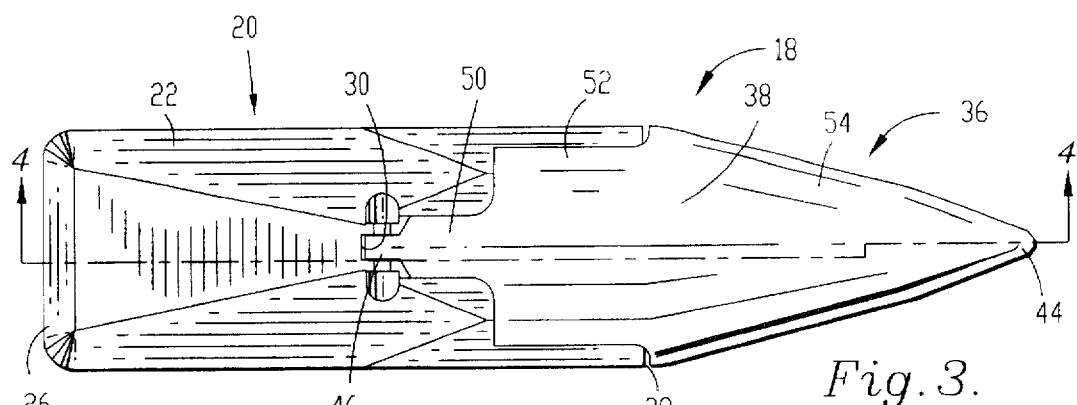
FIG. 3 is a top plan view of the center row crop divider.

As shown in FIG. 3, the upper wall 38 of the snout 36 includes three longitudinal sections 50, 52, 54. The proximal section 50 is adjacent to the protrusion of the tongue that is connected to the divider, and extends laterally from the tongue to cover the groove 30. Thus, the snout protects the groove from debris and prevents it from being blocked. The intermediate section 52 of the upper wall of the snout is generally C-shaped, extending over a larger portion of the upper wall of the divider to assist in guiding crops into the gaps defined by the row units. In addition, the intermediate section overlies the distal end of the divider to define a stop for limiting the extent of pivotal movement of the snout toward the ground. The distal section 54 of the snout protrudes beyond the distal end 28 of the divider and presents a semi-conical profile that facilitates movement of the crop rows toward the row units.

As shown in FIG. 4, the lower wall of the snout underlying the distal section 54 presents a bow having an upwardly turned tip 56. By providing this construction, the snout pivots about the axis defined by the pin when the bow hits the ground, protecting the snout against damage. Along the proximal and intermediate sections of the upper wall, the lower wall is of a shape corresponding generally to the shape of the upper wall except for the provision of the tongue 46.

Figure 5:
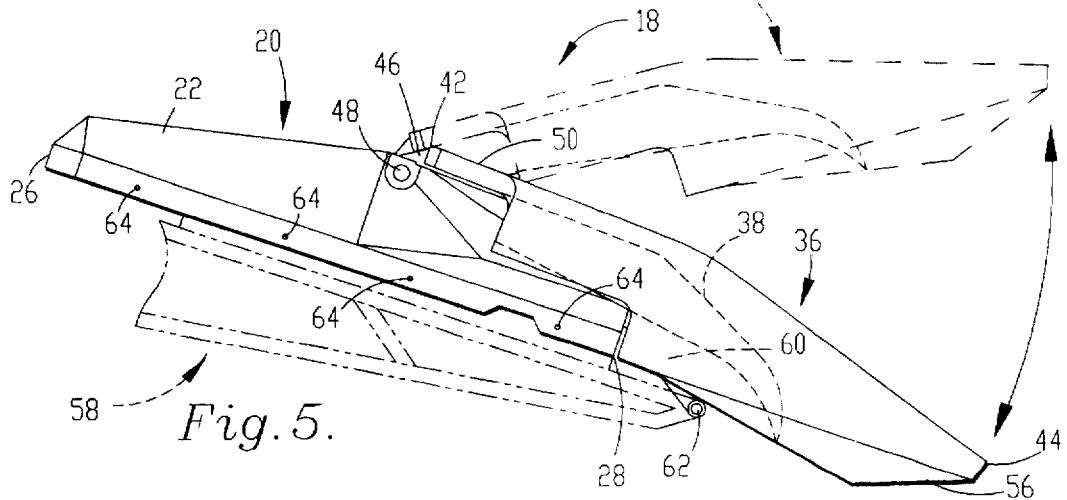
FIG. 5 is a side elevational view of the center row crop divider, illustrating various positions of a snout forming a part of the assembly.

With reference to FIG. 5, each crop divider assembly 18 is supported on one of the row units 58 of the combine by one or more mounting brackets 60 that are connected to the row unit by a pin 62 at the distal end of the unit, and to the divider by a plurality of fasteners secured through holes 64 in the divider. As shown in FIG. 1, the two end row crop divider assemblies 16 are in most respects similar to the center row crop divider assemblies 18. However, each assembly 16 preferably includes a divider 66 that is shaped differently than the dividers 20 of the center row crop assemblies 18. The end row dividers 66 extend beyond the auger 12 to the proximal end of the row crop header frame 10, and are provided with an upper box-shaped section presenting a front wall having a vertical slot 68.

Turning to FIG. 6, one of the row assemblies 16 is illustrated as including a cap 70 that cooperates with the upper box of the divider 66 to prevent crop loss due to bouncing of the crop off of the end row assemblies over the sides of the header.

The cap 70 is formed by rotation molding, and includes a double-walled construction. The cap includes a proximal end 74 that is tapered to present a narrow profile sized for receipt in the slot of the divider 66, and a forward shovel portion 76 having a curved upper wall and a lower wall of a shape corresponding to the shape of the upper wall of the snout. Conventional threaded fasteners 72 are used to secure the cap to the snout 36 so that the cap pivots with the snout relative to the divider 66. The extra height provided by the caps 70 and dividers 66 on the end row crop assemblies 16 deflects crop inward of the header during harvesting, reducing crop loss.

During use, the combine is driven through a field of row crop with the snouts 36 of the crop divider assemblies 16, 18 positioned between adjacent rows of crop so that the crop rows are guided into the gaps defined by the row units of the combine. If the combine travels over uneven ground, the snouts may hit the ground, causing the bows to slide over the ground and pivot the snouts 36 relative to the dividers 20, 66. The spacers 32 of the dividers define stops for limiting the extent of downward pivoting movement of the snouts to prevent the snouts from digging into the ground, and the grooves 30 guide upward pivoting movement of the snouts to prevent unwanted side-to-side shifting thereof. In addition, the slots 68 in the dividers 66 receive the tapered proximal ends 74 of the caps to guide pivotal movement of the caps and snouts.

Although the present invention has been described with reference to the preferred embodiment, it is noted that equivalents may be employed and substitution made herein without departing from the scope of the invention as recited in the claims.

What is claimed is:

1. A crop divider assembly having a central, longitudinal axis and adapted for use on a row crop header, comprising:

an elongated divider having a pair of opposite, proximal and distal ends and provided with means for permitting the divider to be secured to the row crop header;

and elongated snout projecting forwardly from the divider and having a proximal end that overlaps the distal end of the divider; and a single, upper transverse pivot attaching the proximal end of the snout to the divider at a point intermediate said opposite ends of the divider for permitting up and down swinging movement of the snout relative to the divider between raised and lowered positions, the divider including a stop that is engaged by the snout when the snout is pivoted to the lowered position to limit the extent of lowering of the snout relative to the divider, said divider and said snout having bottom surfaces cooperating to define a bottom margin of the assembly that extends from the proximal end of the divider to the distal end of the snout, said pivot being spaced above said bottom margin and located on said central, longitudinal axis of the assembly.

2. A crop divider assembly as recited in claim 1, wherein the divider includes an upper wall defining a centrally disposed groove extending longitudinally from the distal end of the divider toward its proximal end, the snout including a centrally disposed depending tongue extending longitudinally from the upper proximal end of the snout toward its lower distal end, the tongue being sized for receipt in the groove so that the groove guides pivotal movement of the snout and prevents relative lateral shifting.

3. A crop divider assembly as recited in claim 2, wherein the snout includes a transverse hole for the pivot in the upper proximal end of the snout.

4. A crop divider assembly as recited in claim 3, wherein the divider includes a transverse hole extending through the upper wall and intersecting the groove, said pivot extending through the holes in the snout and the divider.

5. A crop divider assembly as recited in claim 1, wherein the divider and snout are formed of polyethylene.

6. A crop divider assembly as recited in claim 5, wherein the divider and snout are of hollow, double-walled construction.

7. A crop divider for use on a row crop header, comprising:

an elongated, hollow, double-walled divider including longitudinally opposed proximal and distal ends, a top wall defining a central fore-and-aft groove extending longitudinally from the distal end of the divider toward the proximal end, and a means for permitting the divider to be secured to the row crop header; and an elongated, hollow, double wall snout pivotally connected to the divider for up and down movement relative thereto, said snout including an upper proximal end, an opposed lower distal end, a semi-conical top wall, and a bottom wall defining a centrally disposed depending fore-and-aft tongue extending longitudinally from the upper proximal end toward the lower distal end, the tongue being sized for receipt in the groove and being confined in the groove so that the groove guides pivotal movement of the snout and prevents relative lateral shifting.

8. A crop divider assembly as claimed in claim 7, said snout being pivotally connected to the divider adjacent said top wall of the divider.

9. A crop divider assembly as claimed in claim 8, said divider and said snout being molded from resinous material.

10. A crop divider assembly as claimed in claim 7, said divider and said snout being molded from resinous material.

* * * * *